March 15, 1932. E. M. ENZENAUER 1,849,183
AUTOMATIC SCRAPER
Filed April 8, 1931 2 Sheets-Sheet 2
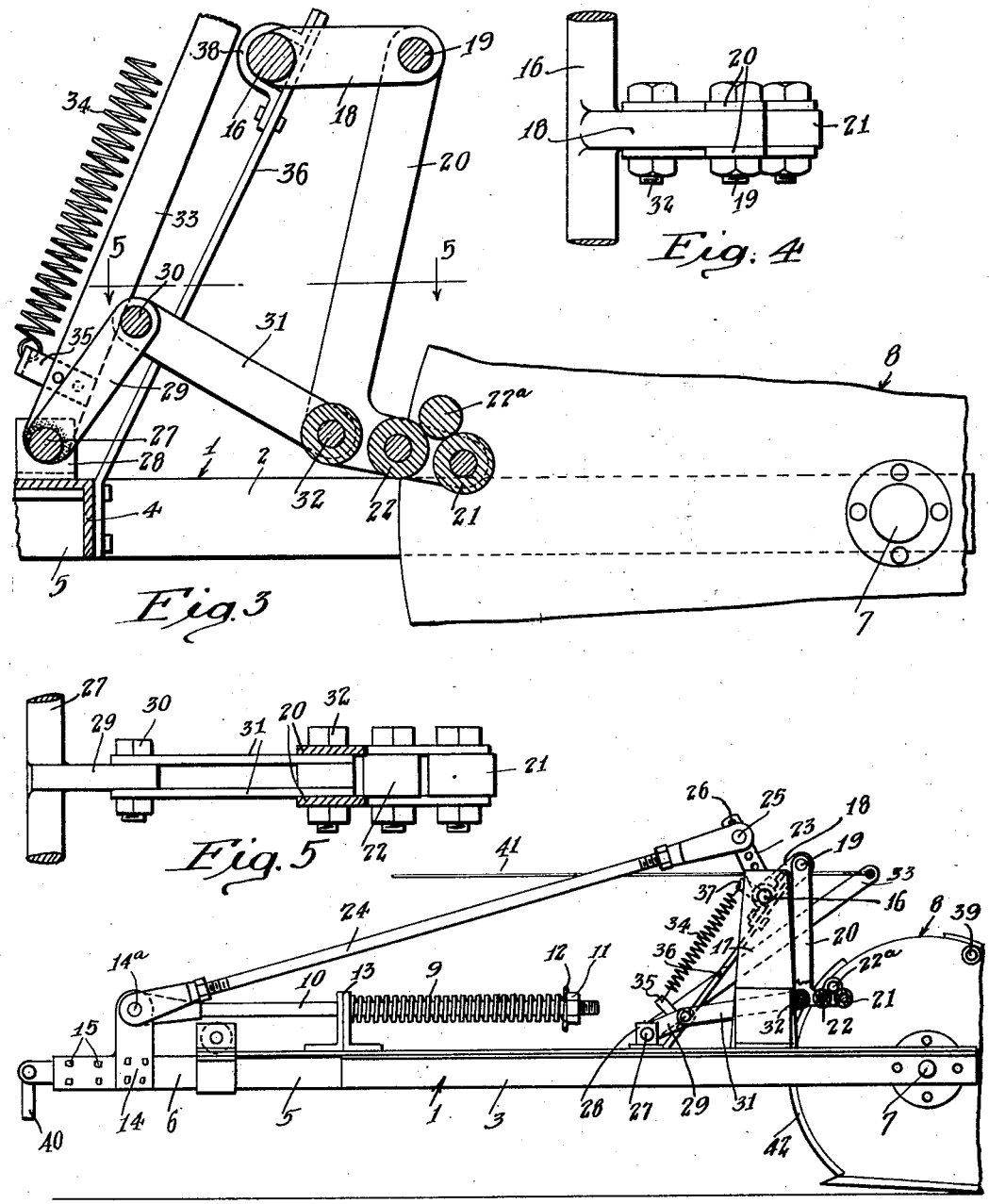

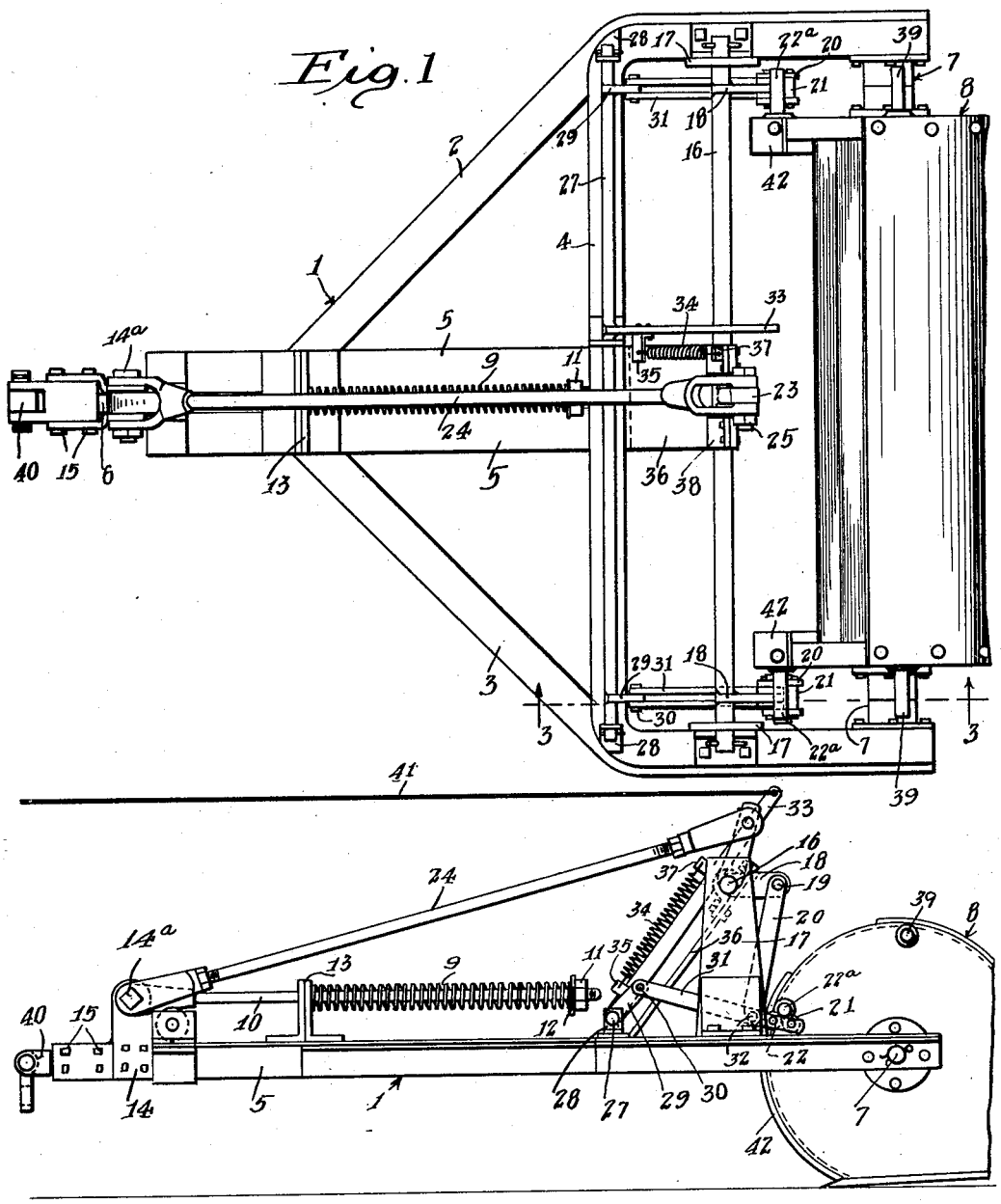

Patented Mar. 15, 1932

1,849,183

UNITED STATES PATENT OFFICE

EDWARD M. ENZENAUER, OF LOS ANGELES, CALIFORNIA, ASSIGNOR TO KILLEFER MANUFACTURING COMPANY, OF LOS ANGELES, CALIFORNIA, A CORPORATION OF CALIFORNIA

AUTOMATIC SCRAPER

Application filed April 8, 1931. Serial No. 528,552.

This invention relates to an automatic tractor drawn scraper of the rotary drag type for carrying earth from one locality to another and especially to that type of scraper which will operate automatically to rotate the bowl from a cutting to a carrying position when the scraper bowl has accumulated a predetermined load.

It is one of the principal objects of this invention to provide a tractor drawn scraper with a sliding draw-bar connection, which will act through suitable connections to rotate the bowl of the scraper from a cutting position to a carrying position when a load of predetermined size has accumulated in the bowl, and to provide a spring balance means for normally holding the bowl in cutting position and which will yield and permit the bowl to be rotated from a cutting to a carrying position when the predetermined load has been gathered.

It is a further object of this invention to provide a control mechanism which will engage and hold against rotation an adjustable stop positioned at each end of the scraper bowl and which will be operated by the extension of the sliding draw-bar to rotate the bowl from a cutting to a carrying position, and having a manually operable means for swinging the control mechanism out of engagement with the stops to permit the bowl to rotate to a spreading or dumping position.

It is a further object of this invention to provide that portion of the control mechanism which is engaged by the adjustable bowl stops with anti-friction rollers to facilitate an easy release of the control mechanism from the stops.

It is a further object of this invention to produce a scraper which will be sturdy and yet extremely simple in construction and in which the control mechanism will operate easily and smoothly.

Other objects and advantages will be more fully apparent from the following description of the accompanying drawings, which form a part of this disclosure, and which illustrate a preferred form or embodiment of the invention. In the drawings:

Figure 1 is a plan view of the invention.

Figure 2 is a side view of Figure 1 illustrating the bowl in cutting position.

Figure 3 is an enlarged fragmental sectional view of a portion of the control mechanism taken substantially along line 3—3 of Figure 1 and looking in the direction of the arrows.

Figure 4 is a fragmental plan view of Figure 3.

Figure 5 is a sectional view taken substantially along the line 5—5 of Figure 3 and looking in the direction of the arrows.

Figure 6 is a view similar to Figure 2 excepting the bowl is illustrated in carrying position.

The scraper illustrated in the drawings includes a frame 1 which is formed of side members 2 and 3 and a cross brace member 4 and two forwardly extending members 5 which are joined to the cross member 4 at their rear end, and to the side members 2 and 3 adjacent their forward end. The forwardly extending members 5 are spaced apart to permit a sliding draw-bar 6 to be slidably mounted therebetween. To the rear end of the side members 2 and 3 is suitably pivoted, as at 7, a substantially cylindrical scraper bowl 8. The pivotal mounting of the scraper bowl will permit the bowl to roll as a wheel unless retained in a fixed position by a stop or control means, later to be explained. To normally hold the sliding draw bar in the retracted position, as indicated in Figures 1 and 2, a spring 9 is mounted upon the rod 10 and engaging at one end the adjusting nut 11 and washer 12, while the forward end of spring 9 engages the stop member 13 which is fixed to the frame members 5 adjacent the forward end of the frame. The forward end of rod 10 is pivotally connected to the bracket 14 by means of a pivot bolt 14ª. The bracket 14 is rigidly secured to the sliding draw-bar by means of the bolts 15.

A control means is provided which will hold the cutting edge of the scraper bowl in a cutting position, as illustrated in Figure 2, and which will be automatically actuated when the scraper bowl has gathered a predetermined load to rotate the bowl backward so that the cutting edge will be elevated to stop further loading of the bowl or to a carrying position, as illustrated in Figure 6.

The control means includes a transverse shaft 16 journaled in brackets 17 which are mounted upon frame 1. Adjacent each end of shaft 16 are arms 18 and to each side of each arm 18 is pivoted by means of bolt 19 a pair of depending hooks or pawls 20. Journaled between the hook portions of the depending pawls 20 are anti-friction rollers 21 and 22 (Figures 3, 4 and 5) which are positioned to be engaged by the stop 22ª positioned at each end of the scraper bowl. As will be noted by referring to Figure 3, the stop 22ª engages and is held by the periphery of the two anti-friction rollers. Mounted upon the transverse shaft 16 is an actuating lever 23 which is connected to the sliding draw-bar 6 by means of rod 24. The forward end of rod 24 is pivoted to bracket 14 by means of the pivot bolt 14ª which also pivotally connects the rod 10 to bracket 14, while the rear end of rod 24 is pivotally connected to the control lever 23 by means of bolt 25. As will be noted from Figure 6, the control lever 23 is provided with a series of adjusting holes 26 into any one of which the rod 24 may be pivotally connected to adjust the control mechanism to meet different soil or operating conditions.

A manually operable release means is provided to swing the pawls 20 out of engagement with the scraper bowl stops 22ª, which includes a transverse shaft 27 journaled upon frame 1 by brackets 28 and adjacent each end is provided an arm 29, and to the upper end of each side of arm 29 is pivoted by means of a bolt 30 a pair of links 31. The rear ends of links 31 are pivotally connected to the lower ends of the pawls 20 by means of a pivot bolt 32 (Figures 3 and 5). A control lever 33 is fixed to shaft 27 and is normally held by means of a spring 34 in a rearward position. The forward end of spring 34 is connected with control lever 33 by means of a bracket 35, while the rear end of spring 34 is connected to a brace member 36 by means of bracket 37. The brace member 36 is provided with a bearing 38 to which the transverse shaft 16 is journaled intermediate the brackets 17, in order to stiffen the transverse shaft adjacent to the operating lever 23. The scraper bowl is provided with a second stop 39 which when engaged by the pawls 20, permits the bowl to be held in a spreading position.

The operation of the scraper is as follows:

The sliding draw-bar 6 is connected to the tractor by means of a suitable link or clevis 40. The tractor is moved forward and as the cutting edge of the scraper bowl is normally held in cutting position, the scraper bowl accumulates a load until the resistance of the scraper bowl in its forward travel is greater than the tension of spring 9 and as a result thereof, the sliding draw-bar 6 will be gradually extended from the frame; the motion of the sliding draw-bar is transmitted through the rod 24 to the control lever 23 through the transverse shaft 16 to each arm 18, whereby each pair of depending pawls 20 is raised and through the engagement with stops 22ª the scraper bowl 8 is rotated in a clockwise direction, which will lift the cutting edge from a cutting to a carrying position.

When the sliding draw-bar 6 has become fully extended the cutting edge of the scraper bowl will have been lifted as illustrated in Figure 6, so that the bowl will accumulate no further load. The scraper is then dragged to the locality at which the load is to be discharged, at which point the operator, by means of rope 41, actuates the control lever 33 to rotate the transverse shaft 27 together with the arms 29 and by means of links 31 to swing the pawls 20 out of engagement with the bowl stops 22ª, which will permit the bowl to rotate in counter-clockwise direction, and if it is desired to spread the load evenly, the operator immediately, upon release of the stop 22ª, permits the spring 34 to swing the control handle 33 to its initial position so that as the scraper bowl rotates, the stop 39 will be caught and held by the pawls 20. In this position the load which has been accumulated in the scraper bowl will spread by the cutting edge of the bowl which has been rotated to a substantially vertical position. In the spreading position it will be noted that the bowl will ride upon shoes 42 which will act as runners, permitting an easy draft of the scraper.

The scraper is now ready for the next load and after the scraper has been moved to the locality at which it is desired to pick up another load, the control lever 33 is again actuated to swing the pawls 20 out of engagement with the spreading stop 39, thus permitting the bowl to rotate until the stops 22ª are again engaged and held by the swinging pawls 20. Upon accumulation of a predetermined load, as previously described, the bowl will automatically rotate to lift the cutting edge from a cutting to a carrying position, and when the scraper has again reached the dumping locality, the control lever 33 is again actuated to swing the pawls 20 out of engagement with the stop 22ª. If it is desired to dump the load in a pile, the control lever 33 is held in the forward position until the stop 39 has passed the pawls 20, thus permitting the bowl to make a complete revolution and thus dumping the load in a pile. The amount of load to be accumulated in the bowl can be adjusted by increasing or decreasing the tension of spring 9 by means of the adjusting nut 11 or by connecting the rod 24 into one of the other adjusting holes 26 of lever 23.

One of the important features of this invention is the provision of anti-friction rollers for engaging the stops 22ª and 39, so that when the pawls 20 are swung out of engagement with the stops 22ª or 39 the anti-friction rollers 21 will roll across the surface of the stops, thus permitting an easy release therefrom.

It is to be understood that the embodiment of the invention described herein is only one of the many embodiments this invention may take, and I do not wish to be limited in the practice of the invention, nor in the claims, to the particular embodiment set forth.

I claim:

1. A scraper including the combination of a frame provided with a sliding draw-bar, a bowl pivoted to said frame, a spring means acting to yieldingly retain said sliding draw-bar in retracted position, a control mechanism comprising a transverse shaft journaled upon said frame, an arm positioned adjacent each end of said transverse shaft, a pair of depending pawls pivoted to each of said arms and having a pair of anti-friction rollers journaled between their hooked portions and normally held in position to engage a stop means positioned at each end of said bowl, a connecting means between said transverse shaft and said sliding draw-bar for rotating said shaft as said draw bar becomes extended to elevate said pawls to rotate said bowl from a cutting to a carrying position, and means for swinging said depending pawls out of engagement with said bowl stops.

2. A control mechanism for an automatic sliding draw-bar type scraper including a transverse shaft journaled to the frame of the scraper at a point above the center of rotation of the scraper bowl and having an arm positioned adjacent each end of said shaft, a depending pawl pivotally mounted to each side of each of said arms, a pair of anti-friction rollers journaled between the hooked ends of said depending pawls and normally held in position to engage a stop means positioned at each end of the scraper bowl, a connecting means between said transverse shaft and the sliding draw-bar for rotating said shaft as said draw-bar becomes extended to elevate said depending pawls to rotate the cutting edge of the scraper bowl from a cutting to a carrying position.

3. A control mechanism for an automatic sliding draw-bar type scraper including a transverse shaft journaled to the frame of the scraper at a point above the center of rotation of the scraper bowl and having an arm positioned adjacent each end of said shaft, a depending pawl pivotally mounted to each side of each of said arms, a pair of anti-friction rollers journaled between the hooked ends of said depending pawls and normally held in position to engage a stop means positioned at each end of the scraper bowl, a connecting means between said transverse shaft and the sliding draw-bar for rotating said shaft as said draw-bar becomes extended to elevate said depending pawls to rotate the cutting edge of the scraper bowl from a cutting to a carrying position, and means for swinging said dependent pawls out of engagement with said bowl stops.

4. A scraper including a frame, a bowl pivoted to the frame, a sliding drawbar, a spring means mounted upon said frame and active to yieldingly retain said sliding draw bar in retracted position, a control means including a transverse shaft journaled upon said frame, an arm positioned adjacent each end of said transverse shaft, a depending pawl pivoted to each of said arms and having the hooked portions thereof normally held in position to engage a stop means positioned at each end of said bowl; a means operatively connecting said transverse shaft to said sliding draw bar, and a release means manually operable for swinging said depending pawls out of engagement with said bowl stops.

Signed at Los Angeles, California, this 19th day of March, 1931.

EDWARD M. ENZENAUER.